Figure 1:
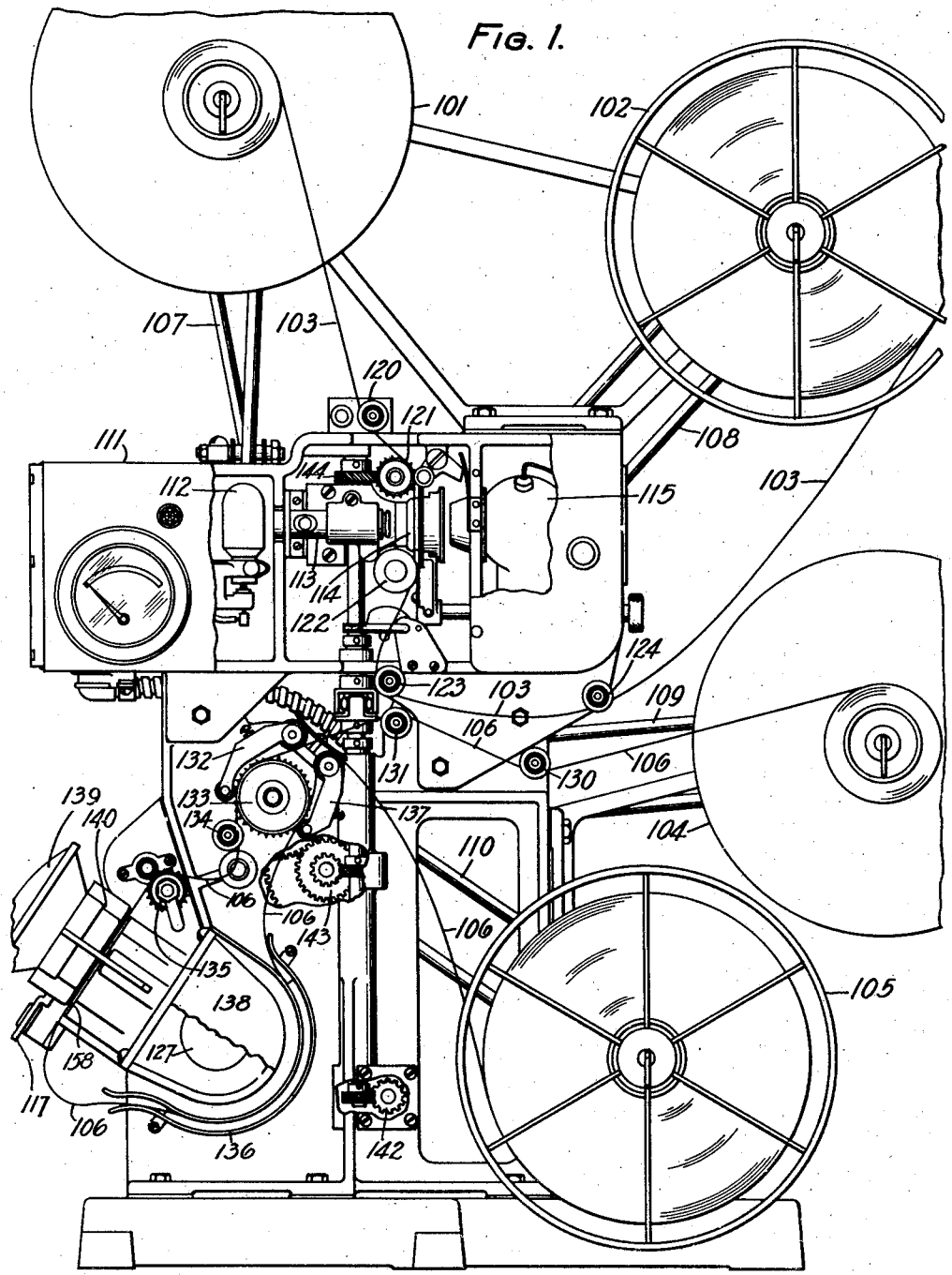

Oct. 17, 1933.    R. V. TERRY    1,930,913
FILM EDITING MACHINE
Filed March 20, 1930    2 Sheets-Sheet 1

INVENTOR
R. V. TERRY
BY
G. H. Heydt
ATTORNEY

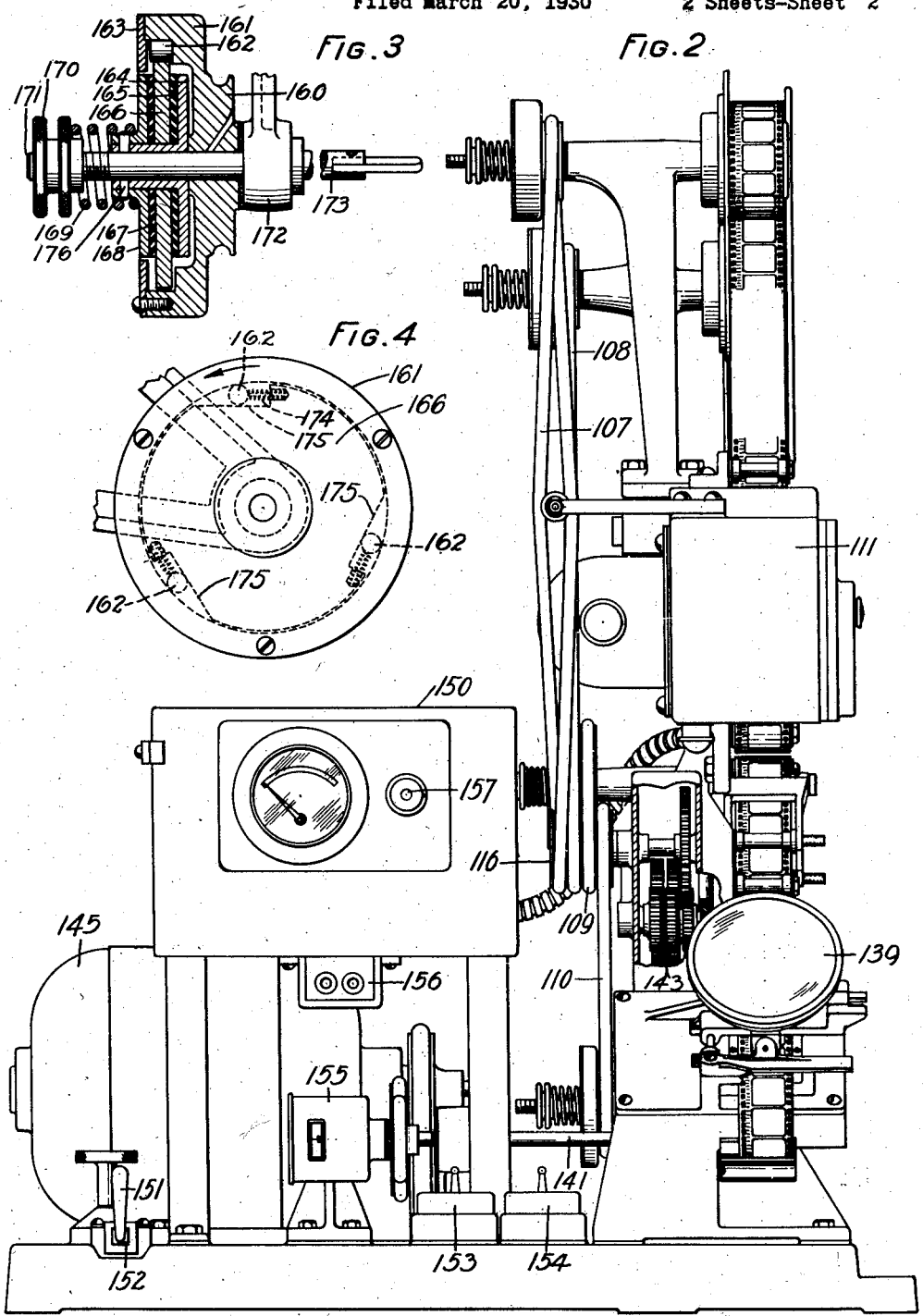

Patented Oct. 17, 1933

1,930,913

UNITED STATES PATENT OFFICE 1,930,913

FILM EDITING MACHINE

Roy V. Terry, Montclair, N. J., assignor to Bell Telephone Laboratories, Incorporated, New York, N. Y., a corporation of New York Application March 20, 1930. Serial No. 437,360

4 Claims. (Cl. 88—14)

This invention relates to a system for editing picture and sound films.

A majority of the present day films for moving pictures with sound featuring a variation of scenes are compositions of a sound film and a plurality of film sections having pictures thereon, taken with a plurality of cameras. Very often a single sound film is made for accompanying various pictures of the same subject taken with a plurality of cameras. The work of combining this plurality of films into a single master film must be carefully accomplished in order to produce pleasing results.

In sound picture reproducing apparatus, the sound reproducer is set a certain distance apart from the picture projector. Thus, in a master film or prints made therefrom, the sound portion of the film must be spaced the same linear distance away from the picture portion of the film to be reproduced synchronously therewith. If the sound and picture film are spliced together before editing, difficulty is experienced in removing or changing sections of the film during the editing of the film, since it is necessary to stagger the cut and the splice to keep the sound and picture synchronously related. It is ordinarily desirable to have the sound film made separately from the picture films. In order to obviate the difficulties heretofore experienced in editing sound picture films it is desirable to separately edit the sound and picture films. By using a method of separately and synchronously editing the sound and picture films straight cuts across the films can be made and accurately spliced and matched for synchronous reproduction before the sound and picture films are finally united to make up the master film. Much may be accomplished in the improvement of the quality of master films and in reducing the cost of producing such films by improved methods of film editing.

The object of this invention is therefore to provide a machine for reviewing separate picture and sound films at the same time or separately.

An embodiment of the present invention comprises a motor driven machine with four film reels, two of which are provided for a sound film and two for a picture film. The sound film and picture film are driven at the same speed by the use of a system of gears for driving both the sprocket for carrying the sound film through a sound reproducing unit and a picture film before a film viewing lens. The take-up reels and the delivery reels for the sound and picture films are belt driven. They are arranged to rotate at various speeds to compensate for varying amounts of film on each reel. To accomplish this a clutch is associated with each reel. The picture film and the sound film are accurately positioned in the machine for synchronously relating the sound and picture. The picture film is carried by a gear driven sprocket through a guide under a viewing lens which has associated therewith a masking plate. The lens and masking plate may be variably positioned in order to properly frame the picture under said plate. The sound film is carried through the sound reproducing unit by a gear driven sprocket, the sound unit having an apertured plate for permitting light to be directed through the film onto a photoelectric cell and a pressure pad for retaining the film against the apertured plate.

The editing machine is arranged for driving the sound film through the reproducing unit and the picture film before the viewing lens in either direction at varying speeds from approximately 30 to 120 feet per minute. With this arrangement the picture and sound films or any portion thereof may be reviewed any number of times and at any of the aforementioned speeds in order to obtain the best results. This is of particular advantage in reviewing portions of the films when changes are contemplated.

A more complete understanding of the invention may be had from the following detailed description, reference being had to the accompanying drawings.

In the illustrated embodiment,

Fig. 1 shows a side elevation of the device with separate picture and sound films on respective reels; Fig. 2 shows a front elevation to better show the driving mechanism for the film; and Figs. 3 and 4 show the internal driving mechanism of the reels.

The sound reproducing unit is shown at 111 and comprises the usual lamp 112, optical slit 113, aperture plate and film pressure pad 114 with associated idler 122, and retaining roller 125, sprocket 121 and the photoelectric cell 115. The film viewing unit is shown at 138, 139 and 140 comprising a lens 139, a masking plate and film guide 140 and a compartment 138 for lamp 127. The two reels shown at the top of Fig. 1 are the take-up reel 101 and the delivery reel 102 for the sound film. The two reels shown in the lower part of Fig. 1 are the take-up reel 104 and the delivery reel 105 for the picture film. The films 103 and 106 are threaded through the apparatus of the editing machine in the manner illustrated in Fig. 1 and properly positioned at the sound reproducer aperature plate and picture viewing masking plate by the operator to have the sound film in synchronous relation with the picture film. The sound film 103 is carried from delivery reel 102 over idler roller 124, idler 123, idler 122, and drawn through sound film carriage and pressure pad 114 by the sound sprocket 121 and delivered to the take-up reel 101 over retaining roller 125 and idler 120. The film 106 is carried from delivery reel 105 over the idler and retaining rollers mounted on bracket 137, over the lower segment of hold-back sprocket 133 and the guide 136 and drawn through film guide 158 under the lens 139 and masking plate 140 by sprocket 135 and retaining roller 146 thence over idler 134, upper segment of hold-back sprocket 133 and retaining roller and idling rollers mounted on bracket 132, idler roller 131, idler roller 130 to the take-up reel 104.

Consideration will now be given to the driving mechanism for controlling the movement of the sprockets and reels. Switch 153, shown in Fig. 2, is provided for connecting a current source with motor 145. A motor brush shifting lever is shown at 152. This lever may be moved horizontally through the agency of lever handle 151. The motor is belt connected to shaft 141 for driving the film editing mechanism as hereinafter described. Meter 155 is also belt connected to shaft 141 for indicating the speed of said shaft which may be altered by altering the speed of the motor. The speed and the direction of rotation of the motor may be changed by the movement of the brush shifting lever 152 controllable from lever handle 151. Shaft 141 terminates in a gear set 142 as shown in Fig. 1. Shaft 147 is driven by the gear set 142 which in turn drives gear set 143 and 144. The gears in gear set 143 are arranged for driving sprockets 133 and 135. Gear set 143 is also arranged for driving the four reels 101, 102, 104 and 105. These reels are connected to the gear driven pulley 116 by belts 107, 108, 109 and 110. Gear set 144 drives sprockets 121. The gear driven sprockets and reels are thus arranged to carry both the sound and picture films through their respective paths in the film editing machine at a uniform speed. It may be seen that, with the arrangement shown there can be no possible loss of synchronism between the sprockets carrying the picture film before the viewing lens and the sound film through the sound reproducing unit. Each reel has therein a clutch arranged to compensate for the variance in the film load carried by the reel and thus the speed of rotation of each reel varies according to the amount of film thereon.

The sound unit 111 is associated with amplifier 150. This amplifier may be any of the well known amplifying units used for sound reproduction. Switch 157 is shown for connecting current supply with the amplifier and with lamp 112 of the sound reproducing unit. The manner of exciting the photoelectric cell 115 by light projected from lamp 112 through the sound film is well known in the art. Electric current is produced in the photoelectric cell in accodance with the striations of the sound film which current is amplified by amplifier 111 for transmission to a loud speaker or head receiver. Jack 156 is arranged for the association of a loud speaker or head receiver with the amplifying unit. Switch 154 is provided for connecting a current source with the film viewing lamp 127 mounted inside of encasement 138. This lamp is used under the picture film for supplying light for observation of the pictures as they pass under lens 139.

After the films have been properly positioned the mechanism of the editing machine is thus started by the actuation of switches 153, 154 and 157. Ordinarily, a head receiver is connected by a plug and cord with one of the jacks at 156. Two jacks are provided in order that two head receivers may be used when two editors wish to listen to the reproduction from the sound film. An editor adjusts the masking plate for framing the pictures of the picture film by the movement of lever arm 117 shown in Fig. 1. He listens to the sound reproduction and observes the accompanying pictures through lens 139. Any portion of the picture film may be marked for cutting by raising the lens away from the film. The corresponding portion of the sound film may be marked at the aperture plate. The films may be cut and a section removed during the process of reviewing without removing the entire film from the machine.

It is very often desirable to patch a number of picture sections together during the review of a single sound film which may accompany any or all of a plurality of picture sections that may be used to make up a film. Let it be assumed that the editor wishes to remove a picture section that has already been run before the viewing lens. To accomplish this the motor 145 is stopped and thus the movement of the films is arrested. Regulator 152 may be used for stopping the motor independent of switch 153. This regulator may then be adjusted to operate the motor for reversing the direction of rotation of shaft 141. The section of film to be removed is now run before the lens 139 in the reverse direction and the sound film is likewise run in the reverse direction. During this procedure the motor is run slowly by reason of the adjustment of regulator 152 in order that the film position for cutting may be readily found. The film to be removed is drawn by hand from reel 105. If a new section of picture film is put in the place of the section removed, the sound film need not be altered. However, if the picture section is removed without the insertion of a new section, the related section must accordingly be removed from the sound film 103.

When the direction of the motor is reversed, reels 102 and 105 act in the capacity of take-up reels and reels 101 and 104 as delivery reels. The internal driving mechanism of the reels is shown in Figs. 3 and 4 in which 171 is the shaft which extends through housing 172 for holding the film reel at 173. The pulley 160 is arranged for driving belts, such as 107, 108, 109 or 110. The pulley 160 is fastened to housing 161 and the circular disc 163 is also fastened to the housing 161. The reel shaft is friction driven through discs 165, 166 and 167 which are maintained in position through the agency of spring 169 and its adjusting nut 170. The driving clutch for the discs is best shown in Fig. 4 in which rollers 162 ride in the slots 175 and are slightly pressed forward by springs 174. The compression of these springs is very light, only being sufficient to prevent the roller 162 from sticking. When the reel is used as a take-up reel the housing 161 is driven in a direction indicated by the arrow. The balls roll forward and act as a clutch between housing 161 and disc 166. When the reel acts in a capacity of a delivery reel the housing is driven in the opposite direction and thus the ball is rolled toward the large end of slot 175 which releases the driving discs and permits the film to be freely taken from the reel.

The relation of the driving discs to each other is best shown in Fig. 3. As previously described disc 166 is driven by the roller clutch. Discs 164 and 168 have tubular portions extending over the shaft, one fitted over the other and pinned to the shaft at 176. When motion is imparted to disc 166 by the ball clutch, the shaft and reel are rotated through the agency of friction discs 165 and 167 which are held between the driving disc 166 and the discs 164 and 168 which are fastened to the shaft. By this arrangement, the reel may be driven at varying speeds according to its load. The normal speed of driving the reel takes into consideration a reel with no film thereon. The take-up reels can rotate only at a speed according to linear delivery of film from the sprockets. As the roll of film becomes larger the reel must rotate more slowly. Variable slippage takes place between the driving discs as the film builds up on the reels and in consequence of this the housing 161 and disc 166 rotate faster than the shaft and the reel are permitted to rotate.

A decided advantage from the viewpoint of ease and accuracy in making cuts and splices is obtained by the ability to separately edit the sound and picture films which makes straight cuts and splices possible.

The finished picture film and sound film united to form a master film may be reviewed for final inspection in this same machine. For this purpose, only two reels are used. Reel 105 is used as a delivery reel and reel 101 as a take-up reel. The master film including both sound and picture portions is threaded from reel 105 over idler and retaining rollers 137, and lower segment of hold back sprocket 133, guide 136 through guide 158 under masking plate 140, sprocket 135, and retaining roller 146, idler roller 134, upper segment of hold back sprocket 133, retaining roller and idler rollers mounted on bracket 132, idler roller 122, sound gate 114, sprocket 121 and retaining roller 125, idler roller 120 to take-up reel 101. The mechanism of the editing machine for reviewing the master film is used in the same manner as it is for reviewing the film separately. Since the sound film has been printed to the picture film with the associated sound and picture portions of the film a certain linear distance apart, the picture and sound may be synchronously reviewed by the editor.

What is claimed is:

1. In a film editing machine, a sound record editing unit, a film viewing unit having a picture film viewing lens, a common driving means for both units arranged to maintain a synchronous relation between film sound records and film picture records, members for operating two delivery reels and two takeup reels, means for operating said machine with said two delivery reels and said two takeup reels for simultaneously editing the picture record and accompanying sound record of separate films, said picture record film being routed from one of said delivery reels through a film guide and picture framing mask under said picture viewing lens and over guide rollers individual to said film to one of said takeup reels, said sound record film being routed from a second of said delivery reels over guide rollers individual to said film through a sound translating position in said sound reproducing unit to a second of said takeup reels and means for operating said machine with one of said delivery reels and one of said takeup reels for simultaneously editing the picture record and accompanying sound record of a film having both said records thereon, said single film being routed from said delivery reel through said picture guide and picture framing mask under said picture viewing lens and through said sound translating position in said sound reproducing unit to said take-up reel.

2. A film editing machine arranged for simultaneously editing picture and accompanying sound records, a sound record editing unit, a film viewing unit having a film viewing lens, a common driving means for both units arranged to maintain a synchronous relation between said picture record and sound record, means to operate said driving means to drive the mechanism of said units in either of two directions and consequently the film in either of two directions through said machine, reels for said films, operating members for said reels and means in said members automatically responsive to the direction of movement of said mechanism to operate any reel as a delivery or takeup reel.

3. A film editing machine arranged for simultaneously editing picture and accompanying sound records of a film having both records thereon or the picture record and accompanying sound record of separate films, a sound record editing unit, a film viewing unit having a film viewing lens, a common driving means for both units arranged to maintain a synchronous relation between said picture records and sound records, means to operate said driving means to drive the mechanism of said units in either of two directions and consequently the films in either of two directions through said machine, reels for said films, operating members for said reels, and means in said members automatically responsive to the direction of movement of said mechanism to operate any reel as a delivery or takeup reel.

4. A film editing machine arranged for simultaneously editing picture and accompanying sound records of a film having both records thereon or the picture record and accompanying sound record of separate films, a sound record editing unit, a film viewing unit having a film viewing lens, a common driving means for both units arranged to maintain a synchronous relation between said picture records and sound records, means to operate said driving means to drive the mechanism of said units in either of two directions and consequently the films in either of two directions through said machines, reels for said films and an overriding clutch for each reel arranged to engage the reels with and disengage the reels from the driving mechanism thus operating the reels as delivery or takeup reels depending upon the direction of travel of said mechanism.

ROY V. TERRY.